Patented Feb. 24, 1925.

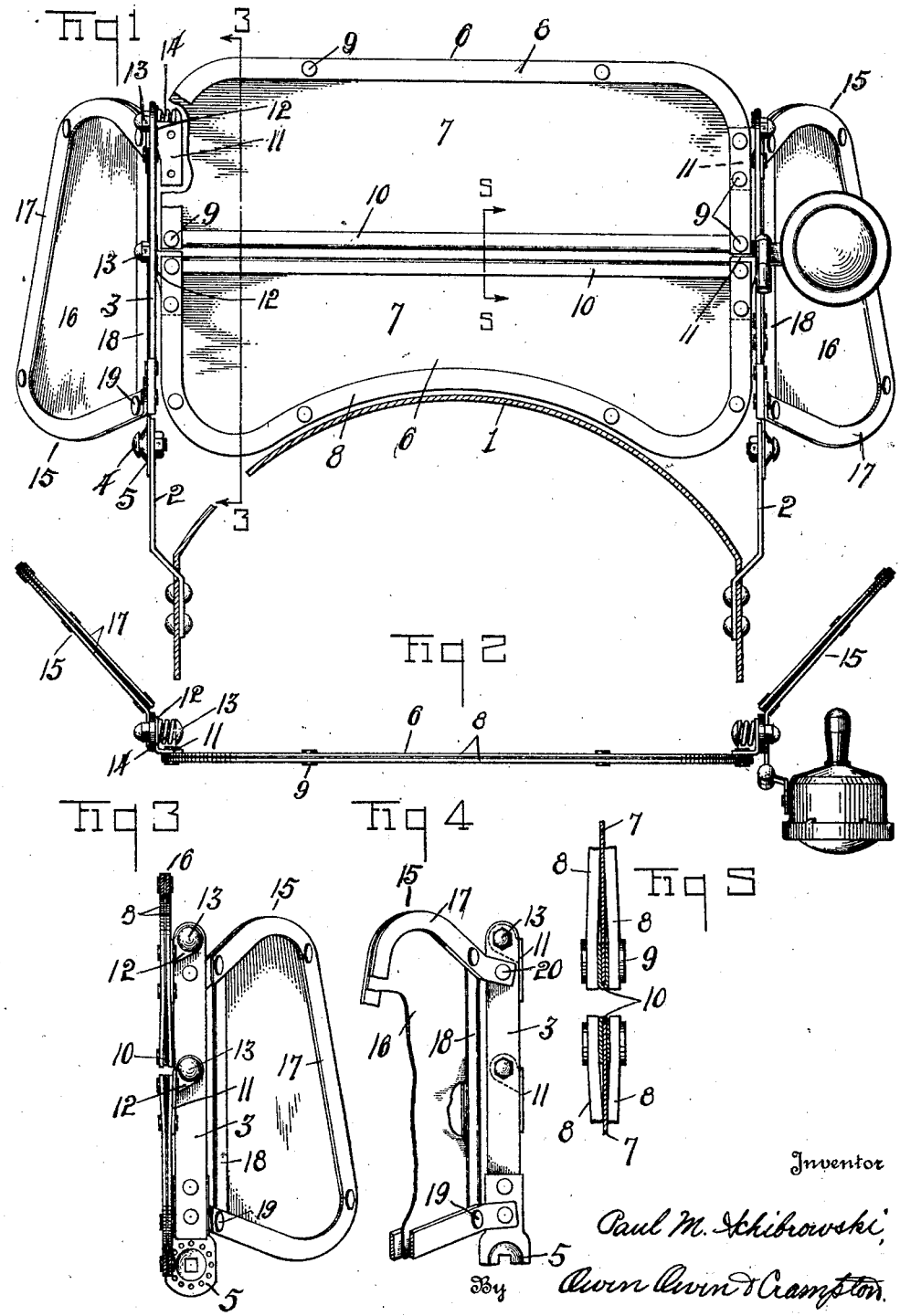

1,527,229

UNITED STATES PATENT OFFICE.

PAUL M. SCHIBROWSKI, OF TOLEDO, OHIO, ASSIGNOR TO THE AMERICAN-NATIONAL COMPANY, OF TOLEDO, OHIO, A CORPORATION OF OHIO.

IMITATION WINDSHIELD FOR JUVENILE VEHICLES.

Application filed March 5, 1924. Serial No. 696,971.

*To all whom it may concern:*

Be it known that I, PAUL M. SCHIBROWSKI, a citizen of the United States, and a resident of Toledo, in the county of Lucas and State of Ohio, have invented a new and useful Imitation Windshield for Juvenile Vehicles, which invention is fully set forth in the following specification.

This invention relates to imitation windshields for use on juvenile vehicles, and has for its object the provision of a windshield of this character of simple, cheap and strong construction, and adapted to closely imitate the windshields of automobiles.

The invention is fully described in the following specification, and while in its broader aspect it is capable of embodiment in numerous forms, a preferred embodiment thereof is illustrated in the accompanying drawings, in which—

Figure 1 is a front elevation of a windshield embodying the invention mounted on the cowl portion of a juvenile vehicle with the latter in section. Fig. 2 is a top view of the windshield. Fig. 3 is a section thereof on the line 3—3 in Fig. 1. Fig. 4 is an end view thereof with parts broken away, and Fig. 5 is an enlarged section on the line 5—5 in Fig. 1.

Referring to the drawings, 1 designates the cowl of a juvenile automobile, and 2 bracket members fixed to and rising from the opposite side portions of the cowl. A windshield mounting standard 3, preferably of strapped metal, is pivotally secured at its lower end by a bolt 4 to the upper end of each bracket 2 for swinging adjustment in a plane longitudinal to the vehicle, the bolt passing through the upper end of the bracket 2 and a clamping plate 5 secured to the lower end of the standard. One or more main windshield members 6 are disposed between the two standards 3—3 and connected thereto at their ends for vertical swinging adjustment, as is common with windshields of automobiles.

Each windshield member comprises a strip of transparent material 7, such for instance as celluloid, one of the outer longitudinal edges and the two end edges thereof being clamped between opposed U-shaped edge strips 8 of thin material, which are secured together and to the material 7 by rivets 9. The other longitudinal edge of the transparent material 7 is received within the channel of a metallic strip 10 of thin material, which is doubled upon itself or U-shaped in cross-section to form a channel for receiving the material, and has its ends extending between the adjacent ends of the edge strips 8 and secured thereto by some of the rivets 9. Each windshield member 6 has a bracket plate 11 riveted or otherwise rigidly secured to the strips 8 at each end of the windshield member. An apertured bearing ear 12 projects at an angle from the outer edge of each bracket plate 11 in a plane longitudinal to the swinging adjusting movements of the associated standard 3, and is pivotally secured to the inner side of such standard in lapping relation thereto by a bolt 13, thereby mounting the windshield member for vertical swinging adjustment. A coiled expansion spring 14 is mounted on each bolt 13 with its opposite ends thrust against the bolt 13 and ear 12, and adapt the ears to have yielding frictional bearing against the respective standards to serve to retain the windshield member in any position of adjustment.

The standards 3 also carry side windshield members 15, each being substantially the same in construction except differing in shape, to the windshield members 6. In this connection, each side member 15 includes a strip of transparent material 16, the outer sides and upper and lower end edges of which are engaged between opposed edge binding strips 17 of substantially U-form, and the inner side edge is bound with a metallic channel strip 18, the ends of which are engaged between the adjacent end portions of the edge strip 17 and secured thereto by certain of the securing rivets 19 of such strips. One of the edge strips 17 of each member 15 is extended beyond the inner edge strip 18 and is bent relative to the plane of the member 15 to adapt it to lap the outer side of the adjacent standard 3 to which it is secured by a rivet 20, and to hold the member 15 in a plane which is inclined outwardly and rearwardly from the longitudinal center line of the vehicle.

It is evident that I have provided a windshield construction for use on juvenile vehicles, which construction is attractive in appearance, simple and inexpensive to manufacture, and of sufficient strength to withstand the hard usage to which juvenile vehicles are usually subjected.

I wish it understood that my invention is not limited to any specific construction, arrangement or form of the parts, as it is capable of numerous modifications and changes without departing from the spirit of the claim.

Having thus described my invention, what I claim as new and desire to secure by Letters Patent is:

The combination with a juvenile vehicle having side brackets on its cowl portion, of an imitation windshield construction comprising standards rising from and hingedly secured to said brackets for adjustment in planes longitudinal to the vehicle, means for securing the standards and brackets together and holding them in adjusted relation, a center windshield member disposed between the standards, and a side windshield member disposed at the outer side of each standard, each of said members comprising a strip of transparent material, a pair of U-shaped metallic edge strips secured in opposed relation to a side edge and to the end edges of the transparent strip, a metallic channel strip secured to the other side edge of the transparent strip and having its ends extending between and rigidly secured to the adjacent ends of the opposed edge strips, a hinge bracket secured to each end of the center member to the adjacent portions of the opposed edge strips and having apertured ears projecting therefrom, and means pivotally connecting the ears of the hinge brackets to the standards to mount the center member for vertical swinging adjustment, one of the opposing edge strips of each side member being extended at its ends beyond the channel strip and secured to the adjacent standard in lapping relation thereto and at an angle to the plane of projection of the side members from the standard.

In testimony whereof I have hereunto signed my name to this specification.

PAUL M. SCHIBROWSKI